(12) United States Patent
Wilson

(10) Patent No.: US 9,818,286 B2
(45) Date of Patent: *Nov. 14, 2017

(54) SYSTEM FOR REPELLING A PET FROM A PREDETERMINED AREA

(71) Applicant: Jason Wilson, Columbus, OH (US)

(72) Inventor: Jason Wilson, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,252

(22) Filed: Mar. 21, 2016

(65) Prior Publication Data

US 2016/0198699 A1   Jul. 14, 2016

Related U.S. Application Data

(63) Continuation of application No. 13/721,143, filed on Dec. 20, 2012, now Pat. No. 9,293,027.

(60) Provisional application No. 61/580,832, filed on Dec. 28, 2011.

(51) Int. Cl.
| | |
|---|---|
| G08B 23/00 | (2006.01) |
| G08B 21/18 | (2006.01) |
| A01K 27/00 | (2006.01) |
| A01K 15/02 | (2006.01) |
| A01M 29/10 | (2011.01) |
| A01M 29/18 | (2011.01) |
| A01M 31/00 | (2006.01) |

(52) U.S. Cl.
CPC ............ *G08B 21/18* (2013.01); *A01K 15/021* (2013.01); *A01K 15/023* (2013.01); *A01K 27/006* (2013.01); *A01K 27/009* (2013.01); *A01M 29/10* (2013.01); *A01M 29/18* (2013.01); *A01M 31/002* (2013.01)

(58) Field of Classification Search
CPC ..................................................... A01K 15/023
USPC ....................................... 340/573.1; 119/721
See application file for complete search history.

(56) References Cited

U.S. PATENT DOCUMENTS

| | | | |
|---|---|---|---|
| 4,898,120 A * | 2/1990 | Brose | A01K 11/006 |
| | | | 119/721 |
| 5,067,441 A | 11/1991 | Weinstein | |
| 5,408,956 A | 4/1995 | Quigley | |
| 5,460,124 A | 10/1995 | Grimsley et al. | |
| 5,682,839 A | 11/1997 | Grimsley et al. | |
| 5,852,403 A | 12/1998 | Boardman | |
| 5,872,516 A | 2/1999 | Bonge, Jr. | |
| 6,016,100 A | 1/2000 | Boyd et al. | |
| 6,151,276 A | 11/2000 | Peinetti | |
| 6,166,643 A | 12/2000 | Janning et al. | |
| 6,269,776 B1 | 8/2001 | Grimsley et al. | |
| 6,700,492 B2 | 3/2004 | Touchton et al. | |
| 6,879,300 B2 | 4/2005 | Rochelle et al. | |

(Continued)

*Primary Examiner* — Quan-Zhen Wang
*Assistant Examiner* — Israel Daramola
(74) *Attorney, Agent, or Firm* — Ward Law Office LLC; Jacob M. Ward

(57) ABSTRACT

A system for repelling a pet from at least one predetermined area includes a first device adapted for positioning at the predetermined area. The first device includes at least one of a first receiver and a first transmitter. A second device is adapted for placement on the pet. The second device includes at least one of a second receiver and a second transmitter. At least one of the first device and the second device is configured to warn the pet when the second device approaches the at least one predetermined area, and thereby train the pet to stay away from the predetermined area.

13 Claims, 16 Drawing Sheets

(56) References Cited

U.S. PATENT DOCUMENTS

| | | | |
|---|---|---|---|
| 7,046,152 | B1 | 5/2006 | Peinetti et al. |
| 7,068,174 | B1 | 6/2006 | Peinetti et al. |
| 7,117,822 | B1 | 10/2006 | Peinetti et al. |
| 7,204,204 | B1 | 4/2007 | Peinetti et al. |
| 7,278,376 | B1 | 10/2007 | Peinetti et al. |
| 7,495,570 | B1 | 2/2009 | Peinetti et al. |
| 7,709,136 | B2 | 5/2010 | Touchton et al. |
| 7,848,760 | B2 | 12/2010 | Caspi et al. |
| 7,861,676 | B2 | 1/2011 | Kates |
| 7,886,648 | B2 | 2/2011 | Williams et al. |
| 8,087,335 | B2 | 1/2012 | Shekarri |
| 8,347,817 | B1 | 1/2013 | Miller |
| 9,293,027 | B2 | 3/2016 | Wilson |
| 2009/0051547 | A1* | 2/2009 | McFarland .......... A01K 15/023 340/573.3 |
| 2013/0113621 | A1 | 5/2013 | So |

\* cited by examiner

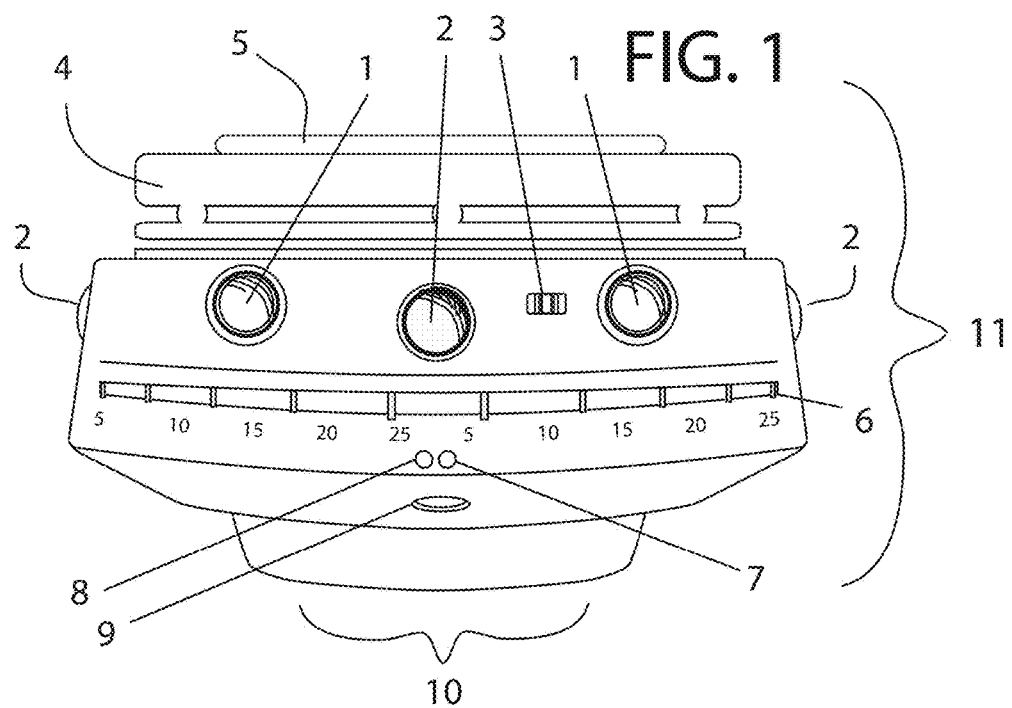
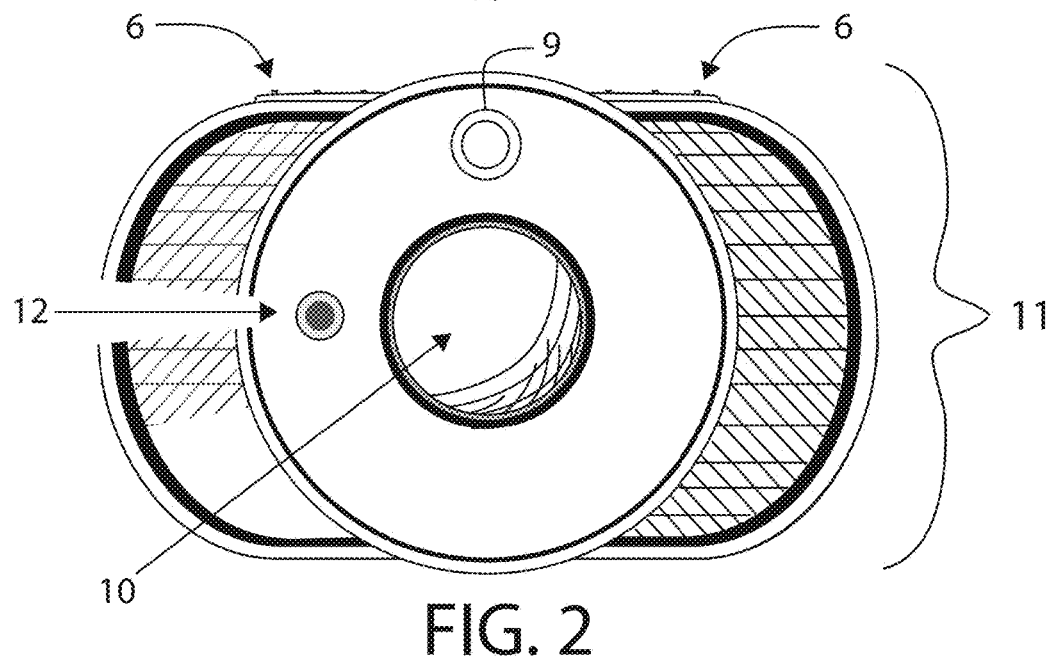

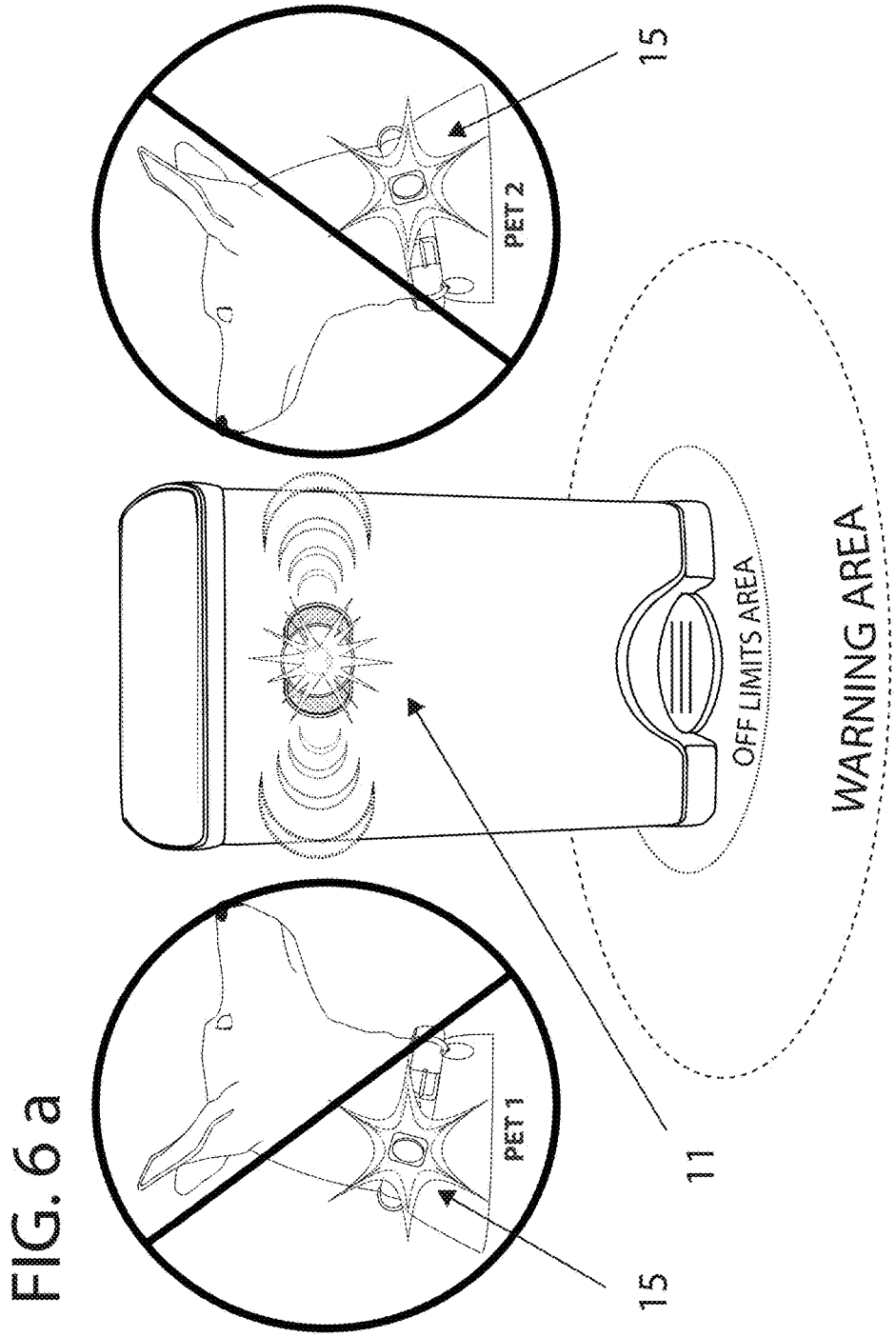

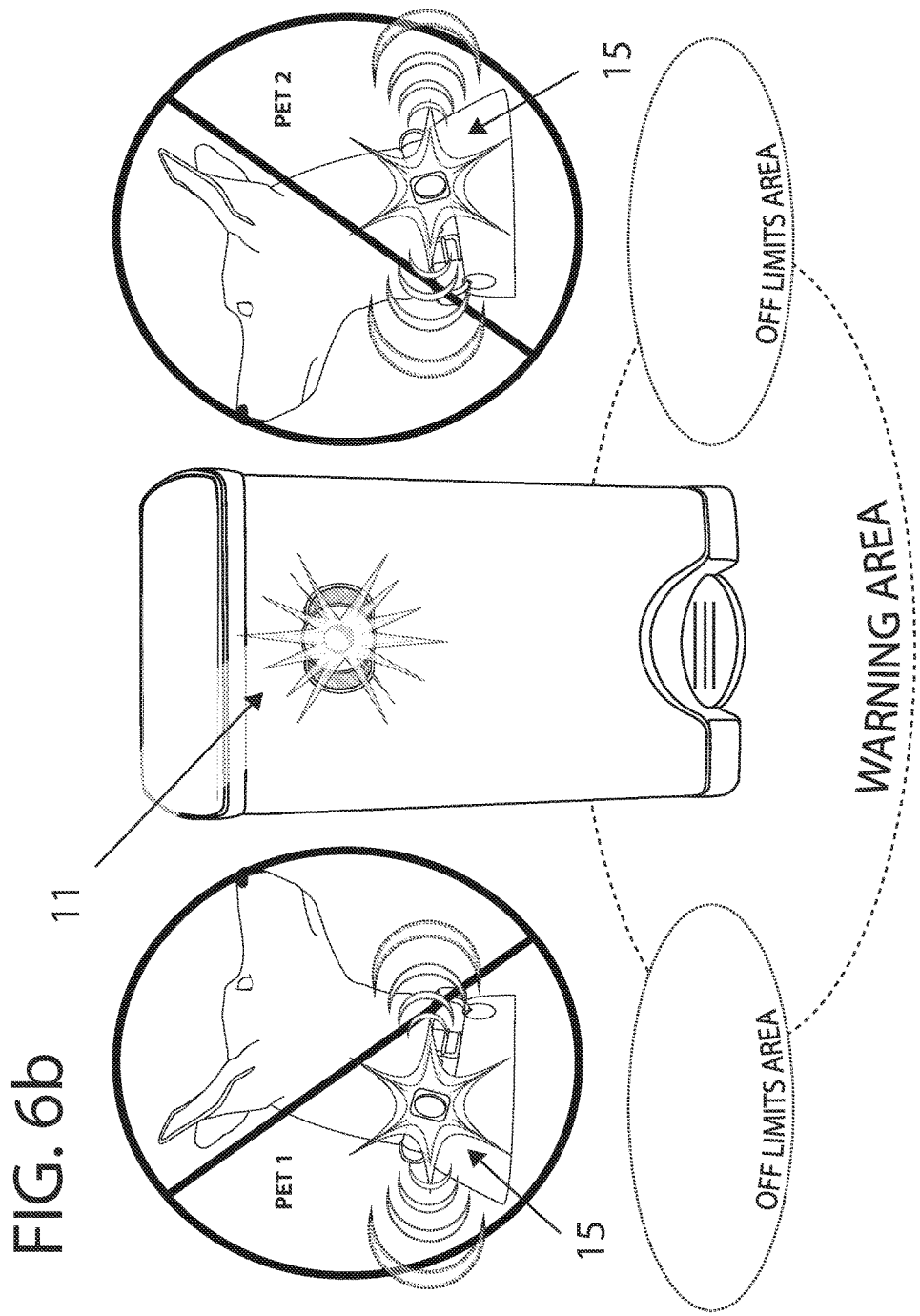

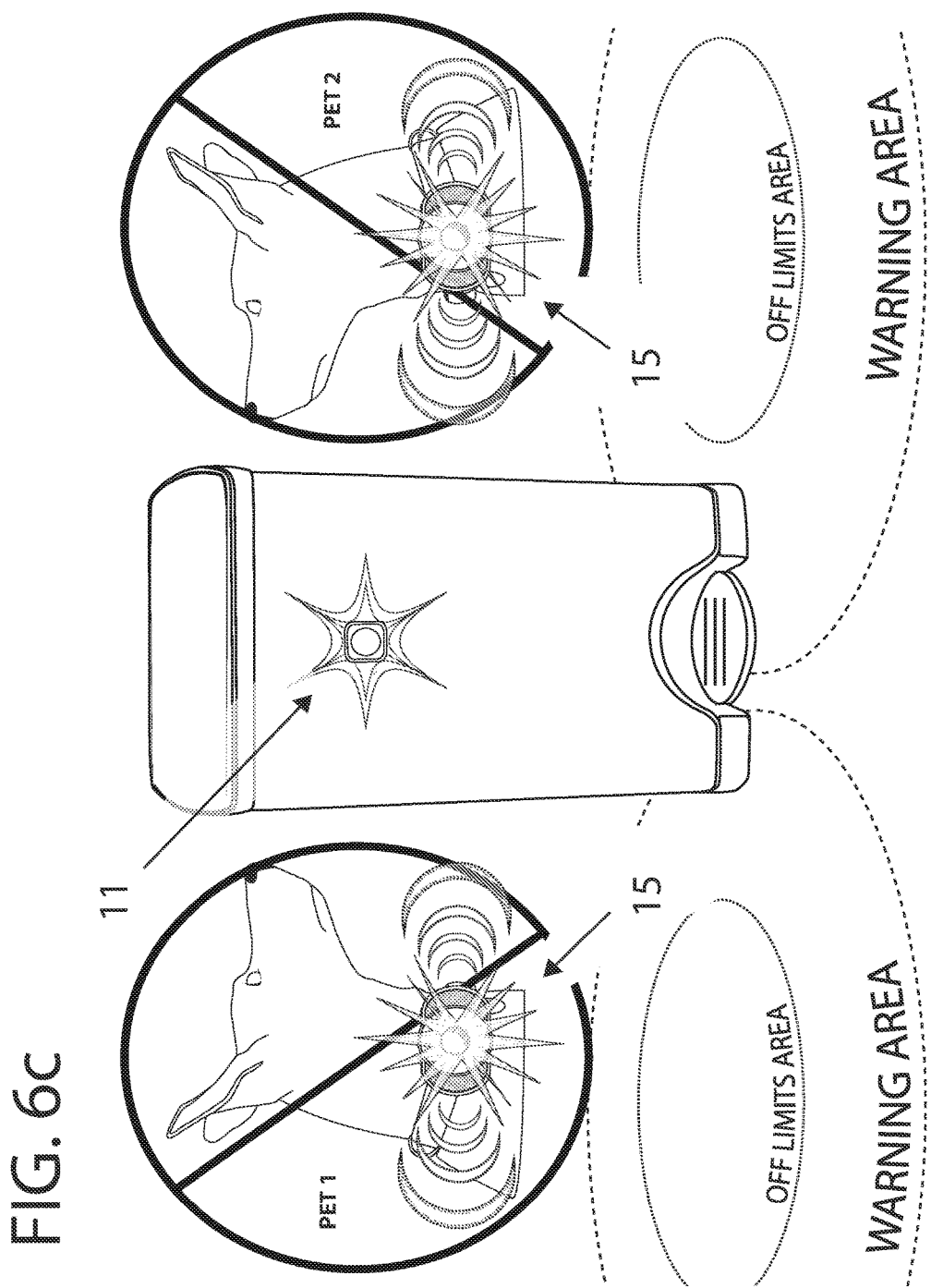

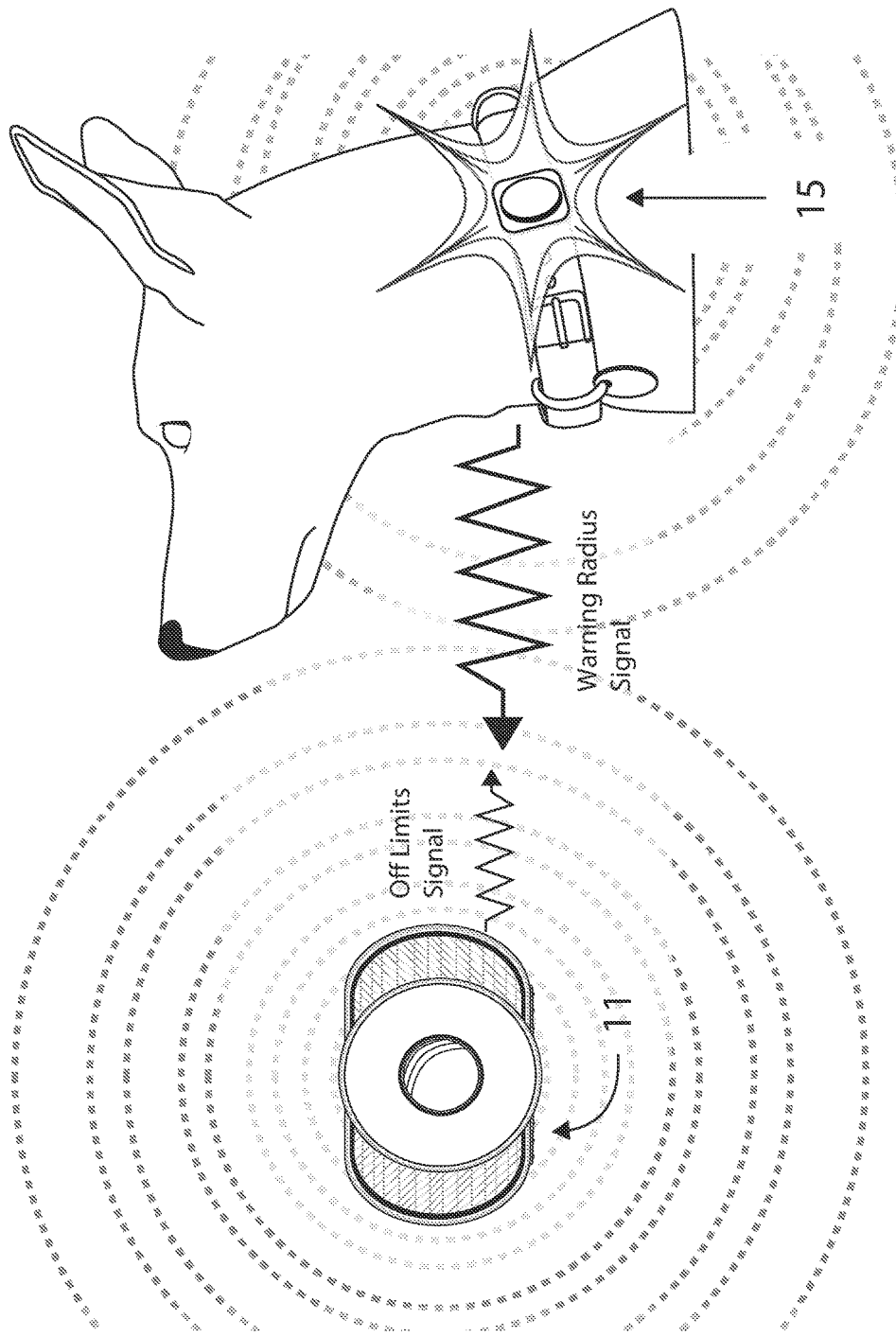

METHODS OF EMPLOYMENT

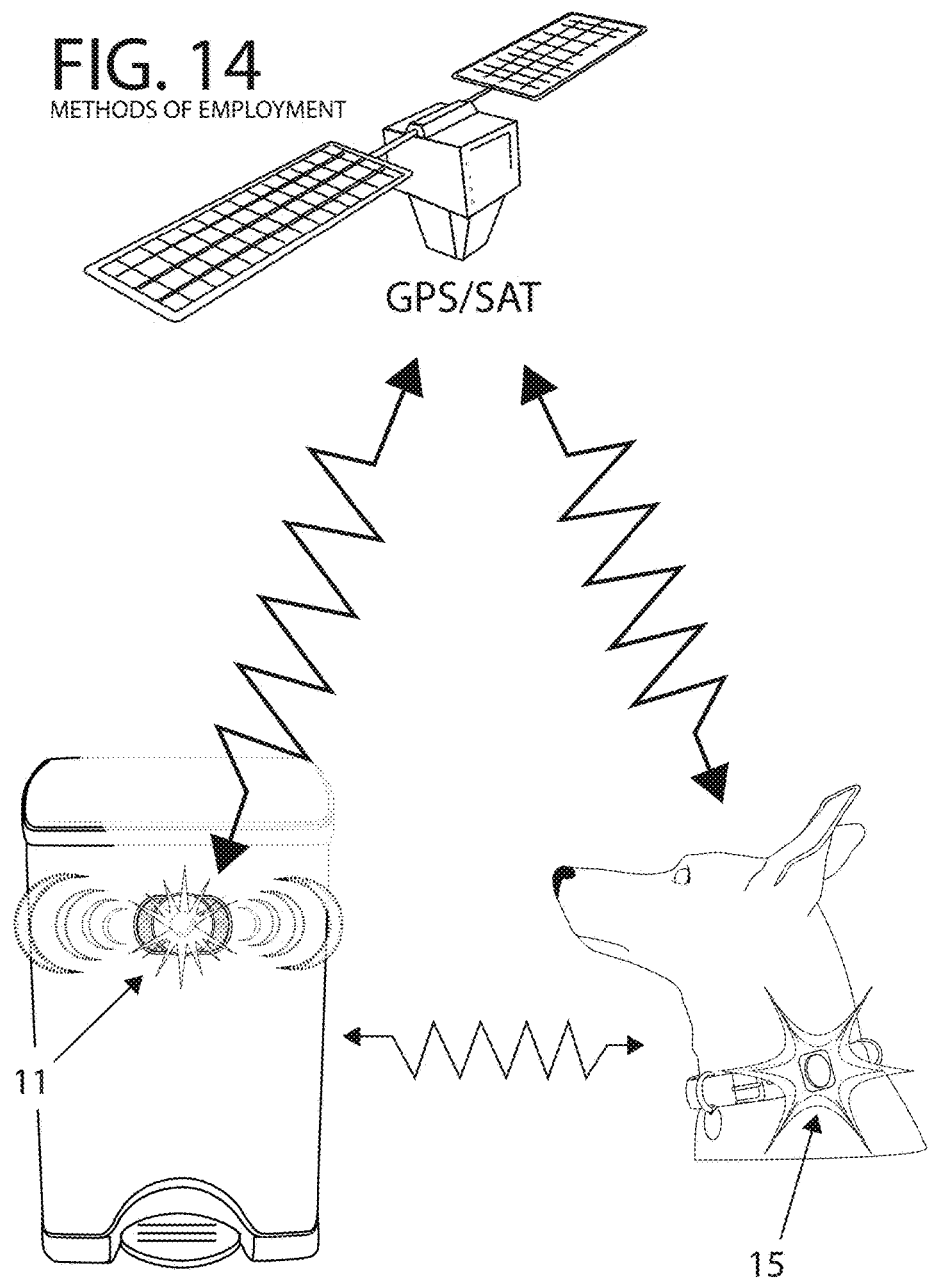

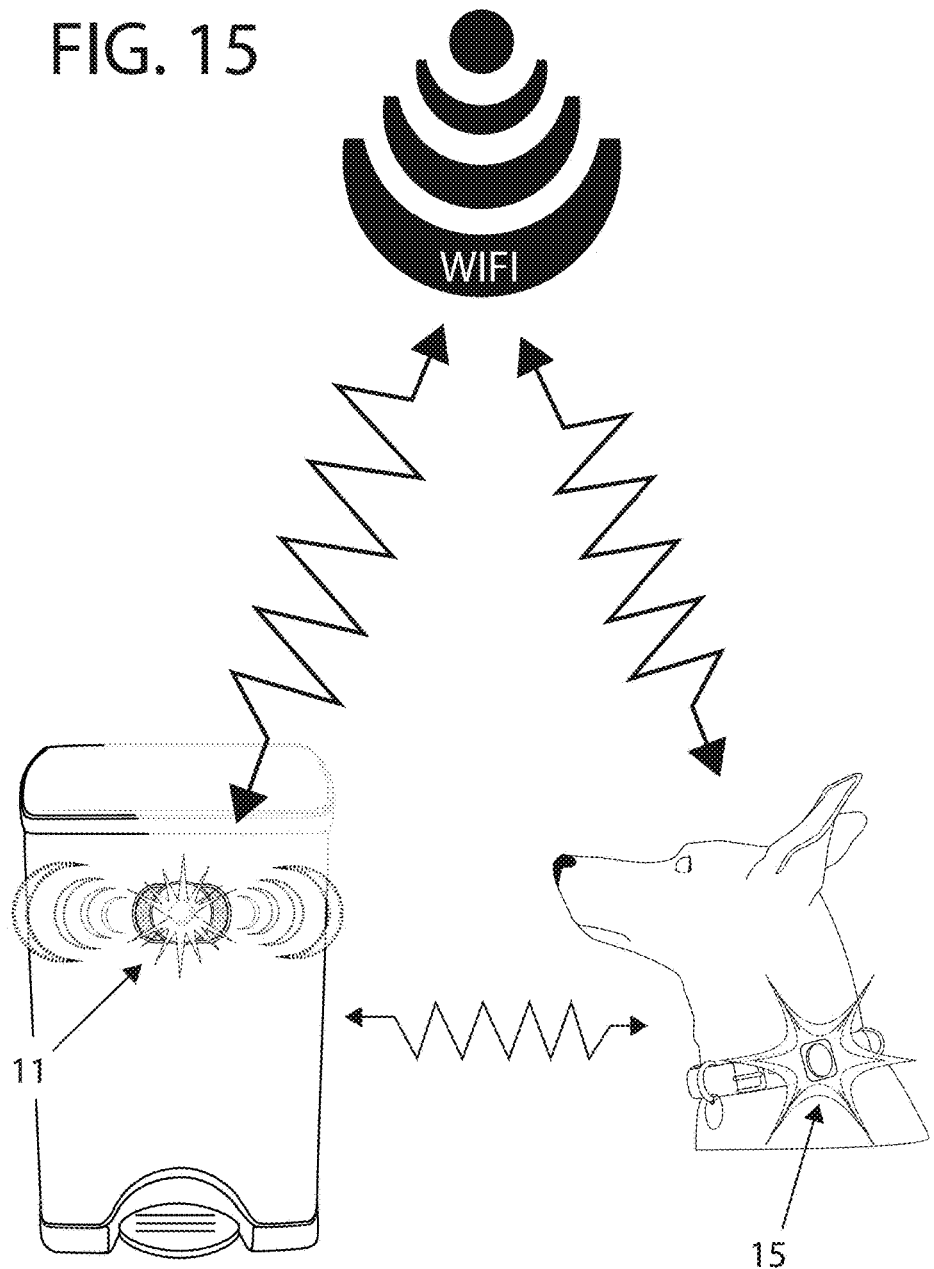

SYSTEM FOR REPELLING A PET FROM A PREDETERMINED AREA

CROSS-REFERENCE TO RELATED APPLICATIONS

This application is a continuation of U.S. patent application Ser. No. 13/721,143, filed on Dec. 20, 2012, which in turn claims the benefit of U.S. Provisional Application No. 61/580,832, filed on Dec. 28, 2011. The entire disclosures of the above applications are hereby incorporated herein by reference.

FIELD OF THE INVENTION

The present disclosure relates to a system and method for training an animal to stay away from a predetermined area and, more particularly, to a system and method including a collar for a pet and an off limits device to be placed in the predetermined area.

BACKGROUND OF THE INVENTION

Animals have instincts embedded deep within their being that help them survive in the wild. These instincts help animals to hunt, track, kill, and feed, and although pets may be domesticated and trained to match our human living conditions, pets still have these natural instincts that will reappear in such forms as (but not limited to) spilling the trashcan to get food, pull food from countertops and tables, destroy precious belongings, or challenging that which is new or foreign to their territory; and in most cases these incidents occur while the pet is home alone or not being watched by its owner. Even though a pet may know right from wrong and act accordingly while in the presence of its owner, the pet's instinct will often take over causing them to break the rules when the opportunity presents itself, and no one or nothing is there to challenge that opportunity.

There is a continuing need for a system for training an animal to stay away from a predetermined area. Desirably, the system and method reminds and corrects the pet when its instincts take over causing the pet to disobey the household rules when the owner is not nearby.

SUMMARY OF THE INVENTION

In concordance with the instant disclosure, a system for training an animal to stay away from a predetermined area, which reminds and corrects the pet when its instincts take over causing the pet to disobey the household rules when the owner is not nearby, is surprisingly discovered.

In a first embodiment, the device contains two different receivers/transmitters. First receiver/transmitter (off-limits receiver/transmitter) will be placed at any object/area the owner wishes to be off-limits to the pet. The second receiver/transmitter (pet receiver/transmitter) will be located on the pet the owner wishes to restrict from the area that is off-limits. The off-limits receiver/transmitter (located at the area/object of off-limits) will send two signals out past the physical location of the area/object that is off limits to two predetermined radiuses defining an off-limits boundary; while the pet transmitter/receiver's signal will remain local and not exceed past the physical location of the pet.

The first/outer signal (being transmitted from the off-limits receiver/transmitter) will act as a warning signal informing the pet that it is coming too close to the off-limits area. The second signal defines the area the owner wishes to be off-limits to the pet. Once the pet comes in contact with the outer signal radius, a bright light will flash from the off-limits receiver/transmitter accompanied by a soft 27 kHz beep warning the pet that it is getting too close to the off-limits area. This powerful LED light acts as a communicator with the pet, informing the pet that it is watching the off limits area. The flash will continue until the pet leaves the warning area. If the pet decides to continue entering into the second signal, despite the previous warning (flashing light), a loud 27 kHz alarm will join the light already flashing from the off-limits receiver/transmitter and continue until the pet leaves the area.

If the pet does not enter into the off-limits area but does not leave the warning area and remains in the warning radius for three seconds or longer a loud 27 kHz alarm will accompany the light already flashing and will continue until the pet leaves the area. This feature is designed to prevent the device's battery life from being drained, as well as, prevent the pet from finding a way to overcome the off-limits device.

The two signals are designed to be aimed at a specific area the owner wishes to be off-limits in order to warn and define to the pet a specific off-limits area by making the area an uncomfortable environment/experience, and thus keeping the pet out of that off-limits area. An owner can determine multiple off-limit boundaries by placing a new off-limit receiver/transmitter at each location he/she wishes to be off limits to a pet. The owner can also determine which pets can go into what areas by properly programming/matching the area's off-limits receiver/transmitter with the desired pet receiver/transmitter attached to each pet they feel should be restricted.

If an owner has multiple pets in a household the owner can choose to have multiple off-limit areas specific to each pet by properly pairing each individual pet's receiver/transmitter to the desired off-limits receiver/transmitter(s). Each pet can be specifically paired to off-limit receiver/transmitter(s) according to each pets needs allowing each pet the freedom of movement throughout the house while restricting them from the areas designated as an off-limits area. This also allows owners more control over his/her pet. The device is a versatile training tool that can be used on any pet that can see and hear within the required signal (example; keeping a cat from unwanted areas such as countertops or tables)

Both off-limit and pet receiver/transmitter are durable and waterproof allowing the pet and owner freedom of movement without the fear of destroying the device.

The device emits a high 27 kHz signal making it an uncomfortable experience for the pet but not disturbing humans. This feature is beneficial for but limited to; maintaining house rules while not disturbing household activities (i.e. sleeping, concentration activities, relaxation) home owner is sleeping (not waking owner) and keeping pets out of baby room without disturbing baby.

In a second embodiment, the device contains two different receivers/transmitters. First receiver/transmitter (off-limits receiver/transmitter) will be placed at any object/area the owner wishes to be off-limits to the pet. The second receiver/transmitter (pet receiver/transmitter) will be located on the pet(s) the owner wishes to restrict from the area/object that is off-limits. The off-limits receiver/transmitter (located at the area/object of off-limits) signal will be contained within the local object/area itself and will not exceed any further; while the pet transmitter/receiver (located on the pet) will send two signals both which will surpass the physical location of the pet creating two separate radiuses around the pet; one which (the furthest extending signal) will define a warning radius to a specific off-limits area and the second signal will define the actual off-limits area. Radiuses for both warning and off-limits area are adjustable and will be determined by the owner.

The further most outer signal (being transmitted from the pet receiver/transmitter) will act as a warning signal informing the pet that it is coming too close to the actual off-limits area. The second signal (being transmitted from the pet receiver/transmitter), when it comes close enough to connect/match with the off-limits receiver/transmitter, defines that the pet has crossed the off limits radius and is now in the off-limits area. When the pet comes in contact with the outer signal radius (warning area), a bright light will flash accompanied by a softer 27 kHz beep from the off-limits receiver/transmitter warning the pet that it is getting too close to the off-limits area. The flash will continue until the pet leaves the warning area. If the pet decides to continue entering the off-limits area thus causing the second radius (being emitted from the pet receiver/transmitter) to enter into the off-limits radius, despite the previous warning (flashing light), the soft 27 kHz beep will transform into a very loud 27 kHz alarm which will accompany the light already flashing from the off-limits receiver/transmitter and will continue until the pet leaves the area.

If the pet enters into the warning area but does not enter into the off-limits area and does not leave the warning area remaining in the warning radius for three seconds or longer the soft 27 kHz beep will transform into a very loud 27 kHz alarm which will accompany the light already flashing and will continue until the pet leaves the area. This feature is designed to prevent the device's battery life from being drained, as well as, prevent the pet from finding an alternative way into the off-limits area(s).

The two signals are designed to be aimed at a specific area the owner wishes to be off-limits in order to warn and define to the pet a specific off-limits area by making the area an uncomfortable environment/experience, and thus keeping the pet out of that off-limits area. An owner can determine multiple off-limit boundaries by placing a new off-limit receiver/transmitter at each location he/she wishes to be off limits to a pet. The owner can also determine which pets can go into what areas by properly programming/matching the area's off-limits receiver/transmitter with the desired pet receiver/transmitter attached to each pet they feel should be restricted.

If an owner has multiple pets in a household the owner can choose to have multiple off-limit areas specific to each pet by properly pairing each individual pet's receiver/transmitter to the desired off-limits receiver/transmitter(s). Each pet can be specifically paired to off-limit receiver/transmitter(s) according to each pets needs allowing each pet the freedom of movement throughout the house while restricting them from the areas designated as an off-limits area. This also allows owners more control over his/her pet even in the absence of the owner. The device is a versatile training tool that can be used on any pet that can see and hear within the required signal (example; keeping a cat from unwanted areas such as countertops or tables)

Both off-limit and pet receiver/transmitter are durable and waterproof allowing the pet and owner freedom of movement without the fear of destroying the device.

The device emits a high 25 kHz signal making it an uncomfortable experience for the pet but not disturbing humans. This feature is beneficial for but limited to; maintaining house rules while not disturbing household activities (i.e. sleeping, concentration activities, relaxation) home owner is sleeping (not waking owner) and keeping pets out of baby room without disturbing baby.

In a particular embodiment, the invention relates to a system including a pet collar and receiver/transmitter device. The device is placed in a particular area, such as on a trash can, and defines an outer warning zone and an inner off-limits zone around the device through the transmission of different signals. As the pet enters the outer zone, the pet collar and the device communicate, and the pet receives a first warning in the form of a flashing light on the device which is accompanied by a soft 27 kHz beep. If the pet ignores the warning signals and continues to move from the outer zone into the inner zone, the pet collar and the device communicate again, and the device or collar will emit an unpleasant sound in a frequency outside a range of human hearing. The device may have a clip or an adhesive backing that permits it to be placed in various locations throughout a household, wherever the owner wishes to deter the pet from entering.

Advantageously, the transmitter and receiver react specific to each pet by its designated off-limits location. One parent may contain all the signal numbers for all receivers that are off limits to that area. The device is distance triggered—as soon as a pet comes within an off limits radius area the transmitter first flashes a warning light accompanied with a soft beep and if the pet continues to the second radius signal the transmitter sounds a siren to scare the pet away. The device may have a light blinking (warning device) bright light which blinks every 0.5 second that the pet is in the off-limits area. The sound signal is distinct to animal type (dog/cat) but high enough signal that a human cannot hear. The area control prevents pets from entering off-limit areas within a 360 degree radius (to include up or down). The device may be battery operated (parent), for example, with a watch battery (trigger). The off-limit receiver/transmitter is equivalent to the size of a small biscuit and is placed on area/object that is off limits. The trigger equals size of two stacked nickels and is placed on the collar of the pet. The device acts as a training aid that communicates to your pet. The device can be interior or exterior (waterproof)—can go anywhere your pet goes. The device is durable (one pet cannot easily chew the chip off another or puncture/break the device). The pet receiver/transmitter may be located within a waterproof pouch and is secured to the pet by wrapping the attached Velcro band around the collar. Sound may be directed in the pet(s) most likely direction of approach. The only direction that the sound will not go is behind the off limits area. Speakers run around the outer ring/sides of the device. The device has an on and off switch. Whereas an electric fence reacts as a broad/large in order to contain or keep a pet within an area, the device of the present disclosure is broken into smaller units with a much smaller signal used to keep a pet out of an area (complete opposite of each other). The device can use such methods as light, alarm, and/or electrical pulse to train pets against off-limit areas.

In one embodiment, a system for repelling a pet from at least one predetermined area includes a first device and a second device. The first device has attachment means for securely affixing the first device to the predetermined area. The first device includes at least one of a first receiver and a first transmitter. A second device is for placement on the pet. The second device includes at least one of a second receiver and a second transmitter. An outer warning zone and an inner off-limits zone at the predetermined area are defined by at least one of the first device and the second device. The inner off-limits zone is disposed entirely within the outer warning zone. The at least one of the first device and the second device are configured to provide a first warning to the pet when the second device enters the outer warning zone. At least one of the first device and the second device are configured to provide a second warning to the pet when the second device enters the inner off-limits zone.

DRAWINGS

The above, as well as other advantages of the present disclosure, will become readily apparent to those skilled in the art from the following detailed description, particularly when considered in the light of the drawings described herein.

FIG. 1 is a top plan view showing the off limits device and all its components from, according to one embodiment of the disclosure;

FIG. 2 is a front elevational view showing the off limits device and all of its components;

FIG. 6a shows one embodiment according to shared warning and stimulus responsibilities between the off limits transmitter/receiver device and pets transmitter/receiver device;

FIG. 6b shows another embodiment according to shared warning and stimulus responsibilities between the off limits transmitter/receiver device and pets transmitter/receiver device;

FIG. 6c shows a further embodiment according to shared warning and stimulus responsibilities between the off limits transmitter/receiver device and pets transmitter/receiver device;

FIG. 9d shows an additional embodiment according to shared signal production responsibilities between the off limits transmitter/receiver device and pets transmitter/receiver device;

FIG. 14 shows the device being used with GPS/SAT technology; and

FIG. 15 shows the device being used with WIFI/Phone technology.

DETAILED DESCRIPTION OF THE INVENTION

Figure 3:
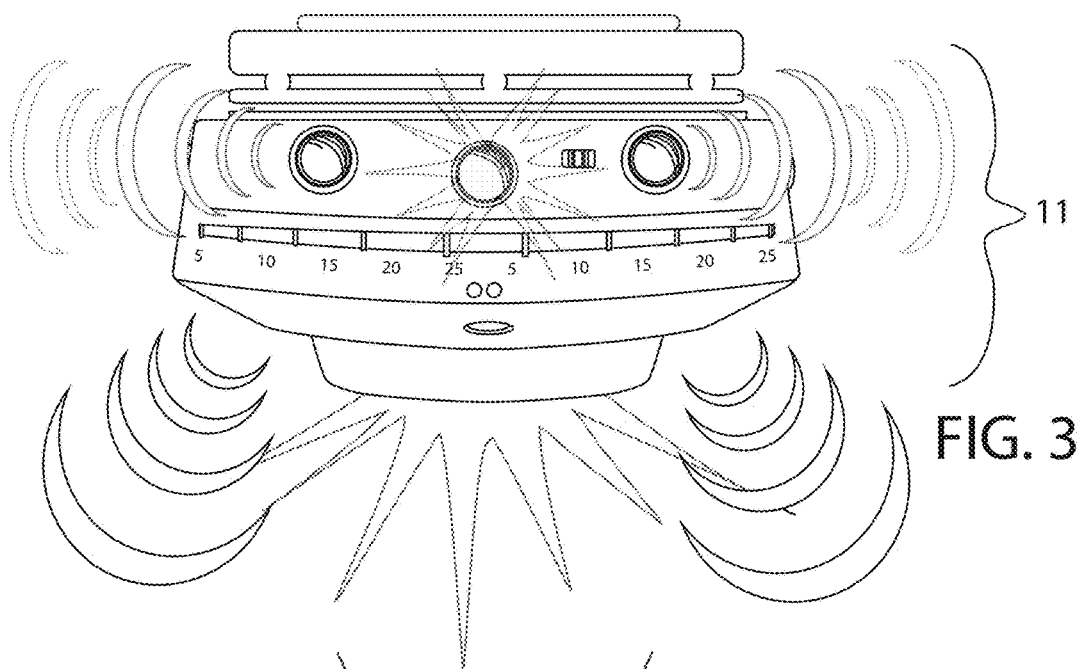
FIG. 3 shows the top plan view of the off limits transmitter/receiver device illustrated in FIG. 1, with LED lighting system and speaker system in use.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the order steps presented is exemplary in nature, and thus, is not necessary or critical unless otherwise disclosed.

DETAILED LEGEND

Reference Number 1. Speaker system—A 27+ kHz alarm speaker system will sound loud enough to scare or ward away any unwarranted pet(s) that enters into a designated off limits area or remains within a designated warning area for longer than 3 seconds. The alarm is designed to be very uncomfortable to a pet, same as a smoke alarm system to a human. If pet does not leave the warning/off limits area after 40 seconds, it is assumed there is an issue and the pet cannot escape and the device will deactivate automatically.

Reference Number 2. Small LED light system—Smaller LED lighting system that circles around device that emits a bright light to any pet that travels into the designated warning area. The light will be a warning to the pet, signaling to it that it must leave the area before a punishment is introduced. The light will be bright enough to be seen on sunny day and located on device so that a pet can see the warning from any direction.

Reference Number 3. On/Off/Training mode switch—On/off switch will be used to power up or turn off the device at any time. The switch will also contain a training mode option that will initiate other signaling functions on the device that will further signal to a pet that they are not allowed in the area. This mode will be used for training or re-training purposes.

Reference Number 4. Mounting bracket/Door—The mounting bracket will be used to mount the device onto a variety of soft/cloth surfaces without damaging the surface of the off limits area. The bracket also acts as a door, leading into the device which is useful for changing the battery or retrieving the photo storage device. The door makes it easy to access inside the device without dismounting the device from the off limits area/object.

Reference Number 5. Attaching adhesive—Attaching adhesive will be used to mount the device to hard surfaces that the device is protecting.

Reference Number 6. Dual radius adjust dial—An adjustable dial that determines the size of the active radius needed for both the warning and off limits areas, making the device customizable to each specific off limits area. One side of the dial will determine the warning radius while the other side will determine the off limits radius. The dial is meant to be set at very short and specific areas but it can be set to longer distances as well for any large areas that are meant to be off limits.

Reference Number 7. Low battery indicator—Is a tiny LED light indicator that informs the owner of when the battery life is getting low and battery will need exchanged with a fully charged battery. The device will have a blinking light to indicate that the device has about one month of battery life remaining and a solid light when battery life is nearly complete.

Reference Number 8. Picture indicator—Picture indicator is a tiny LED light that informs the owner when the pet has been in the off limits/warning area and the device has taken a picture. If owner does not wish to view pictures then he/she can push down on light and easily erase the low resolution photos without taking photo storage device from the device.

Reference Number 9. Camera—Wide angle lens camera will take a low resolution photo of the radius area when a pet enters it and remains for 3 seconds or longer. This device will help show owner if a pet is getting into an off limits area and how it is getting into the area so that the owner can take any necessary actions to correct the issue, if needed.

Reference Number 10. Large LED light system—Large LED lighting system located at the front of the device that emits a bright light to any unpermitted pet that travels into the designated warning area. The light will be a warning to the pet, signaling to it that it must leave the area before a punishment is introduced. The light will be bright enough to be seen on sunny day and located on device so that a pet can see the warning from any direction.

Reference Number 11. Complete off limits device—This is the off limits device in its entirety and will be placed on any object or area that the home owner wishes to be off limits to the pet. The device will be durable and water proof so that the device can be placed on any area without the worries of being damaged.

Reference Number 12. Motion sensor—Motion sensors will detect any movement within the room and triggers the device to search for any pet transmitter/receivers in the area and will continue to do so until motion sensors no longer detect any motion. Owner can choose not to use the sensor and keep the device searching for pet transmitter/receivers at all times.

Reference Number 13. Pet receiver/transmitter component—This is the device that communicates with the off limits transmitter receiver to determine if the pet is entering into an warning area(s) or off limits area(s)

Reference Number 14. Pet receiver/transmitter carrier—This is the protective casing that keeps the pet transmitter/receiver safe from harm. The carrier is designed to be placed on the pets personal collar, eliminating the need for an additional collar and allowing the pet to wear the transmitter/receiver at all times.

Reference Number 15. Complete Pet receiver/transmitter device—This is the compilation of both the carrier and component for the pet's transmitter/receiver.

Reference Number 16. Flexible friction arm 1—A flexible plastic lining/arm that when in the training (vibrating) mode will cause a clicking sound, produced by the passing friction of the two friction arms against each other Reference Number 17. Flexible friction arm 2—A flexible plastic lining/arm that when in the training (vibrating) mode will cause a clicking sound, produced by the passing friction of the two friction arms against each other Reference Number 18. Rotation motor device—The motor that will rotate device back and forth. The purpose of this action is to communicate with the pet that the device is responsible for protecting the off limits area, making the presence of the device itself a deterrent to the pet.

Reference Number 19. Mounting bracket hinge—Hinge is used as a swing door allowing owner easy to access to the inside of the device while keeping the back bracket and device joined together when the door is open. This minimizes the chance for lost parts and making maintenance functions easy to perform.

Reference Number 20. Electrical plug—This is an electrical outlet plug option for the owner in the event that the off limits area is off limits. The owner can plug directly into the wall and not need/use a battery if desired.

Reference Number 21. Recharged battery—Rechargeable battery allows the device to be continuously used without the need to buy batteries or wait for dead batteries to recharge, making the off limit areas vulnerable and more importantly the off limits device inconsistent to the pets training.

Reference Number 22. Dead battery—Rechargeable battery allows the device to be continuously used without the need to buy batteries or wait for dead batteries to recharge, making the off limit areas vulnerable and more importantly the off limits device inconsistent to the pets training.

Reference Number 23. Photo storage device—Photo storage device stores all photos taken from device while pet is in the warning or off limits radiuses. The photos show the owner how and when the pet is getting into the off limits area to allow the owner to make any necessary adjustments. The device is removable, allowing the owner to move it to a computer for viewing. The WIFI version will send emails to the owners account or phone.

DETAILED DESCRIPTION OF DRAWINGS

FIG. 1—The off limits device will be placed at all areas/objects that the owner wants to be off limits to the pet. The device is designed to be a representative of the owner to the pet, communicating to the pet that the particular area/object is not permitted to the pet. If the pet does not listen the device can take a corrective action using a number of methods: high frequency alarm, shock, and vibration. Within drawing are eleven mentionable components:

Speaker system (1)—A 27+ kHz alarm speaker system will alarm loud enough to scare or ward away any unwarranted pet(s) that enters into a designated off limits area or remains within a designated warning area for longer than 3 seconds. The alarm is designed to be very uncomfortable to a pet, same as a smoke alarm system to a human. If pet does not leave the warning/off limits area after 40 seconds, it is assumed there is an issue and the pet cannot escape and the device will deactivate automatically.

Small LED light system (2)—Smaller LED lighting system that circles around device that emits a bright light to any pet that travels into the designated warning area. The light will be a warning to the pet, signaling to it that it must leave the area before a punishment is introduced. The light will be bright enough to be seen on sunny day and is located on device so that a pet can see the warning from any direction.

On/Off/Training mode switch (3)—On/off switch will be used to power up or turn off the device at any time. The switch will also contain a training mode option that will initiate other signaling functions on the device that will further signal to a pet that they are not allowed in the area. This mode will be used for training or re-training purposes.

Mounting bracket/Door (4)—The mounting bracket will be used to mount the device onto a variety of soft/cloth surfaces without damaging the surface of the off limits area. The bracket also acts as a door, leading into the device which is useful for changing the battery or retrieving the photo storage device. The door makes it easy to access inside the device without dismounting the device from the off limits area/object.

Attaching adhesive (5)—Attaching adhesive will be used to mount the device to a hard surfaces that the device will be mounted to.

Dual range finder (6)—An adjustable dial that determines the active radius needed for both the warning and off limits areas, making the device customizable to each specific off limits area. One side of the dial will determine the warning are radius while the other side will determine the off limits radius. The dial is meant to be set at very specific with its range settings but can be set to longer distances as well for any large areas that are meant to be off limits.

Low battery indicator (7)—Indicator informs owner of when the battery life is getting low and battery will need exchanged with a fully charged battery. It will start with a blinking light, indicating that the owner has roughly two weeks battery life remaining and a solid light when battery life is nearly complete.

Picture indicator (8)—Picture indicator informs the owner that the pet has been in the off limits/warning area and that pictures area available for view. If owner does not wish to view pictures then he/she can push down on light and easily erase the low resolution photos without taking photo storage device from the device.

Camera (9)—Wide angle lens that takes a low resolution photo of the area if a pet enters into the warning area and remains for 3 seconds or longer. This device will help show owner if a pet is getting into an off limits area and how it is getting into the area so the owner can take any necessary precautions and/or actions to correct the issue, if needed.

Large LED light system (10)—Large LED lighting system located at the front of the device that emits a bright light to any pet that travels into the designated warning area. The light will be a warning to the pet, signaling to it that it must leave the area before a punishment is introduced. The light will be bright enough to be seen on sunny day and located on device so that a pet can see the warning from any direction.

Complete off limits device (11)—This is the off limits device in its entirety and will be placed on any object or area that the home owner wishes to be off limits to the pet. The device will be durable and water proof so that the device can be placed on any area without the worries of being damaged.

FIG. 2—In the illustration you can see the Large LED lighting system (10) which emits a bright flashing light which communicates or warns the pet when it has entered into a restricted area. There is also a camera (9) located just above the LED lighting system. The camera acts as an informer to the owner of which direction the pet is entering into the off limits area with the pictures it takes. The Dual range finder (6) is located above the camera, located on top of the device. This allows owner to adjust the radius range, making the device adjustable fit the requirements of both the off limits area and pet. To the left of the LED lighting system is a motion sensor (12) which when activated awakes device out of sleep mode as it actively searches for unwanted transmitter receivers in the area.

FIG. 3—This illustrates how the device sends light and sound waves in all directions, insuring that the pet is warned from every direction.

Figure 4:
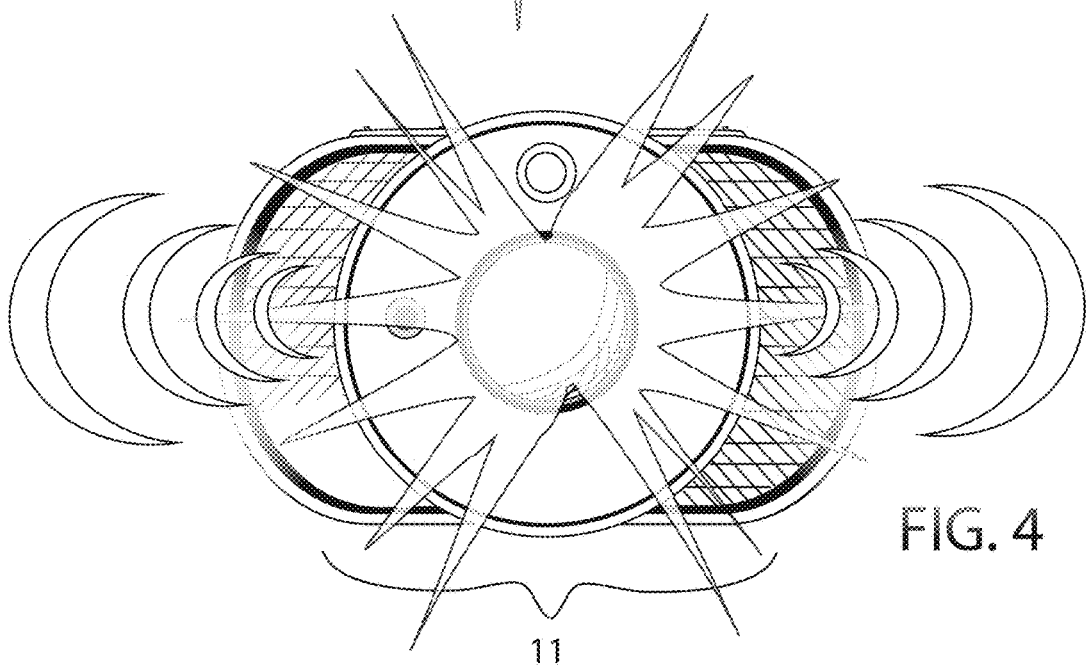
FIG. 4 shows the front elevational view of the off limits transmitter/receiver device illustrated in FIG. 2, with LED lighting system and speaker system in use.

FIG. 4—This illustrates how the device sends light and sound waves in all directions, insuring that the pet is warned from every direction.

Figure 5:
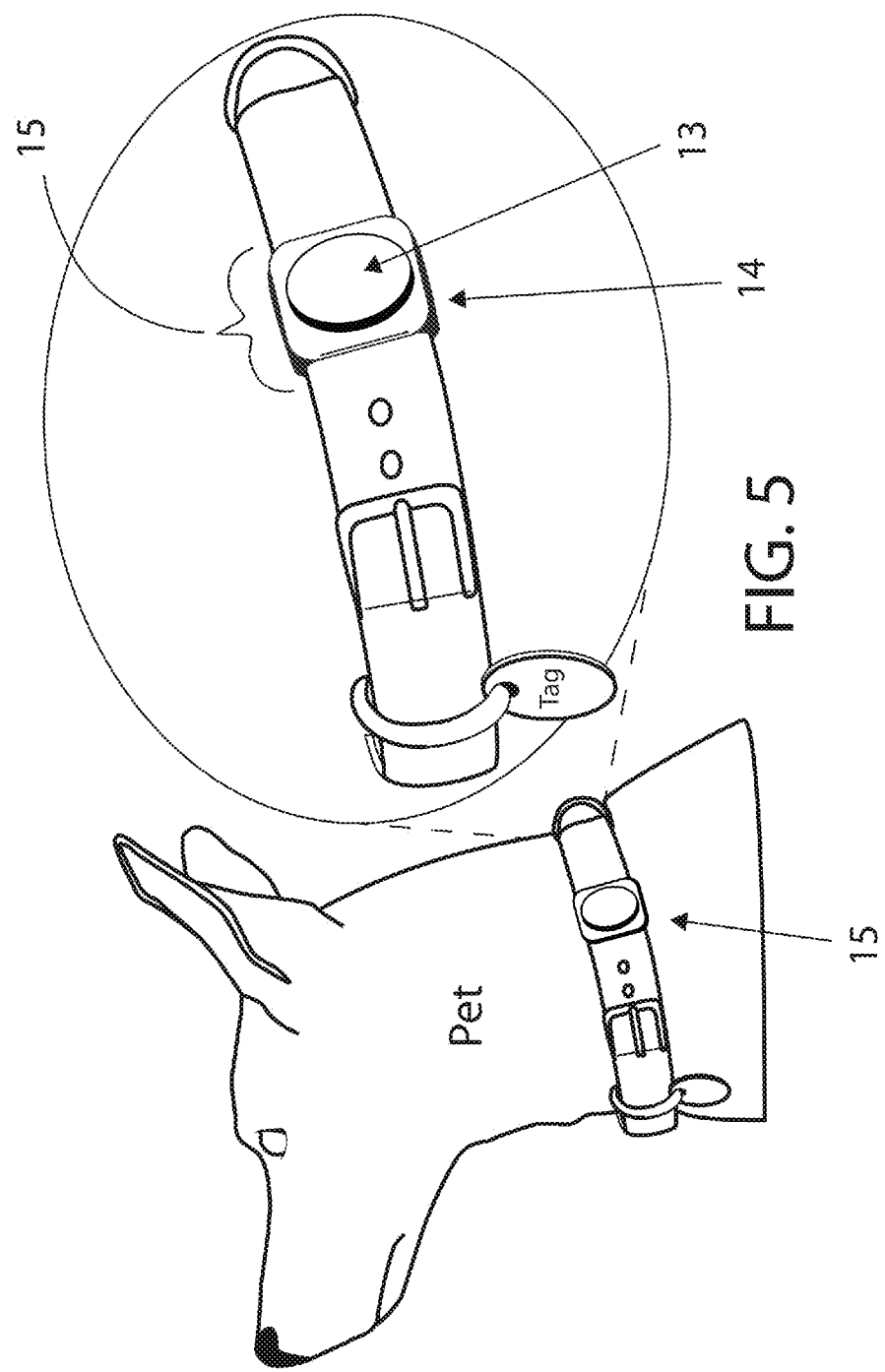
FIG. 5 shows the pets transmitter receiver that would be worn by the pet that is responsible for communicating with the off limits transmitter receiver, keeping the pet out of any unwanted area(s)

FIG. 5—The pet transmitter receiver is small, durable, and designed to be worn by the pet as often as the pet's original collar, ensuring any off limit areas are always protected. Within the illustration is the pet transmitter/receiver (13) which is the communicator with the off limits device and the Pet receiver/transmitter carrier (14) which protects the Pet transmitter/receiver. The complete pet transmitter/receiver device is (15).

FIG. 6a—In this embodiment, embodiment 1, the off-limits receiver/transmitter (11) which is placed on a trash reciprocal, designating that the trash is an off limits area, produces all warning and negative stimulus when the pet(s) transmitter/receiver device (15) enters into the restricted area. The pet(s) transmitter/receiver device (15) has no warning or stimulus responsibilities in this embodiment.

FIG. 6b—In this embodiment, embodiment 2, the off-limits receiver/transmitter (11) which is placed on a trash reciprocal, designating that the trash is an off limits area, share both the warning and stimulus responsibilities with the Pet(s) transmitter/receiver device (15) in any number of possibilities.

FIG. 6c—In this embodiment, embodiment 3, the off-limits receiver/transmitter (11) which is placed on a trash reciprocal, designating that the trash is an off limits area, produces no warning or negative stimulus to the pet. It will contain one small LED light which will communicate with the pet that it is guarding the area but have no other active responsibilities. The pet(s) transmitter/receiver device (15) is responsible for producing all warning and negative stimulus if the pet enters into a restricted area. The warning signals or stimulus correction is engaged when the pet(s) transmitted warning or off limits radius is close enough to the off limits transmitter/receiver device and can communicate with device.

Figure 7:
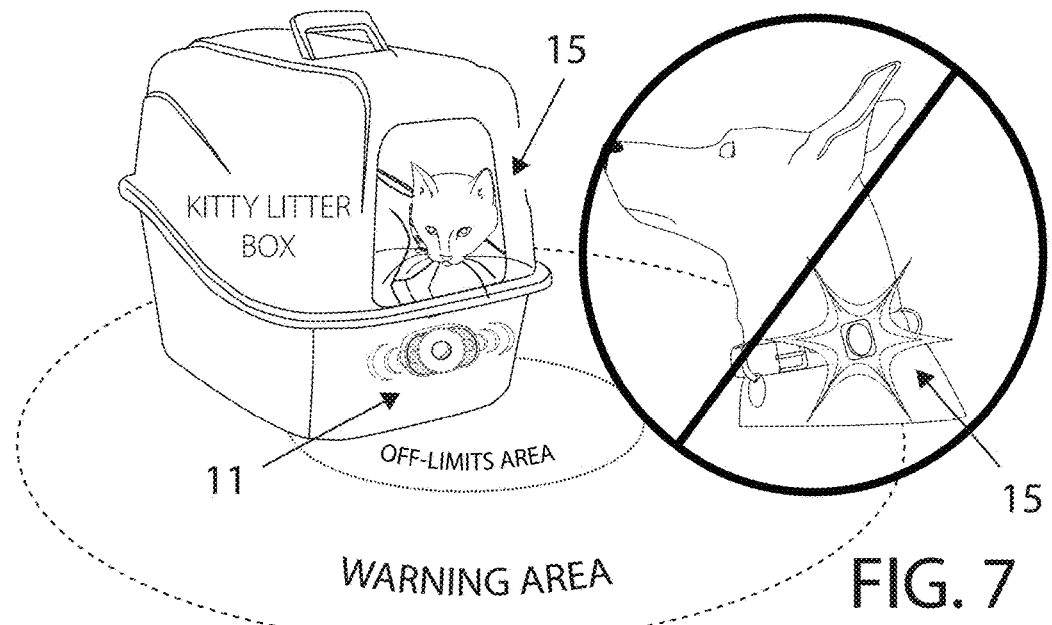
FIG. 7 shows one embodiment where one pet (cat) is permitted to enter into an area but another pet (dog) is not permitted to enter into the area.

FIG. 7—Illustration shows how Off limits transmitter/receiver device (11) is programmed to allow one pet's (cat) transmitter/receiver device (15) to enter into kitty litter box but due to proper programming with other pet's (dog) transmitter/receiver device (15), the kitty litter box has become an off limits area and the dog cannot enter into area.

Figure 8:
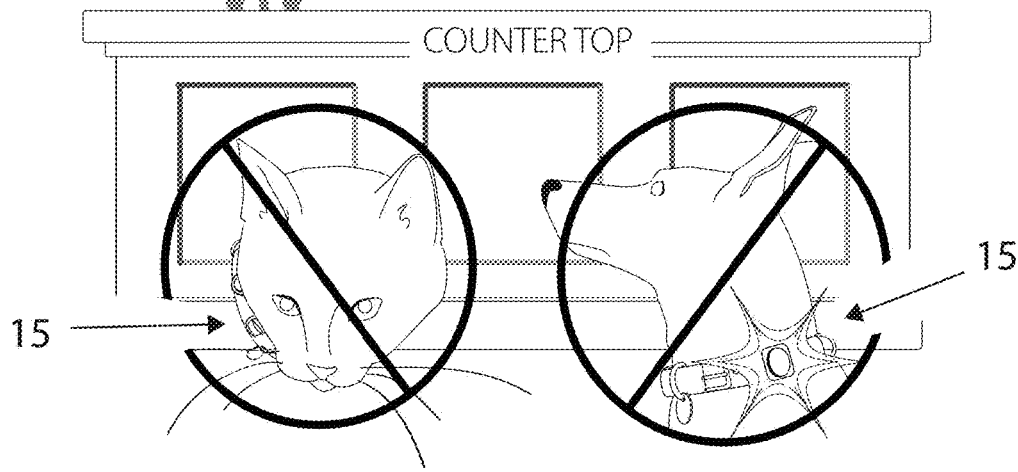
FIG. 8 shows another embodiment where one pet (cat) is permitted to enter into an area but another pet (dog) is not permitted to enter into the area.

FIG. 8—Illustration shows how Off limits transmitter/receiver device (11) is programmed not to allow either pets' (dog and cat) transmitter/receiver device (15) to enter onto the counter top, making the counter top an off limits area for both pets.

Figure 9A:
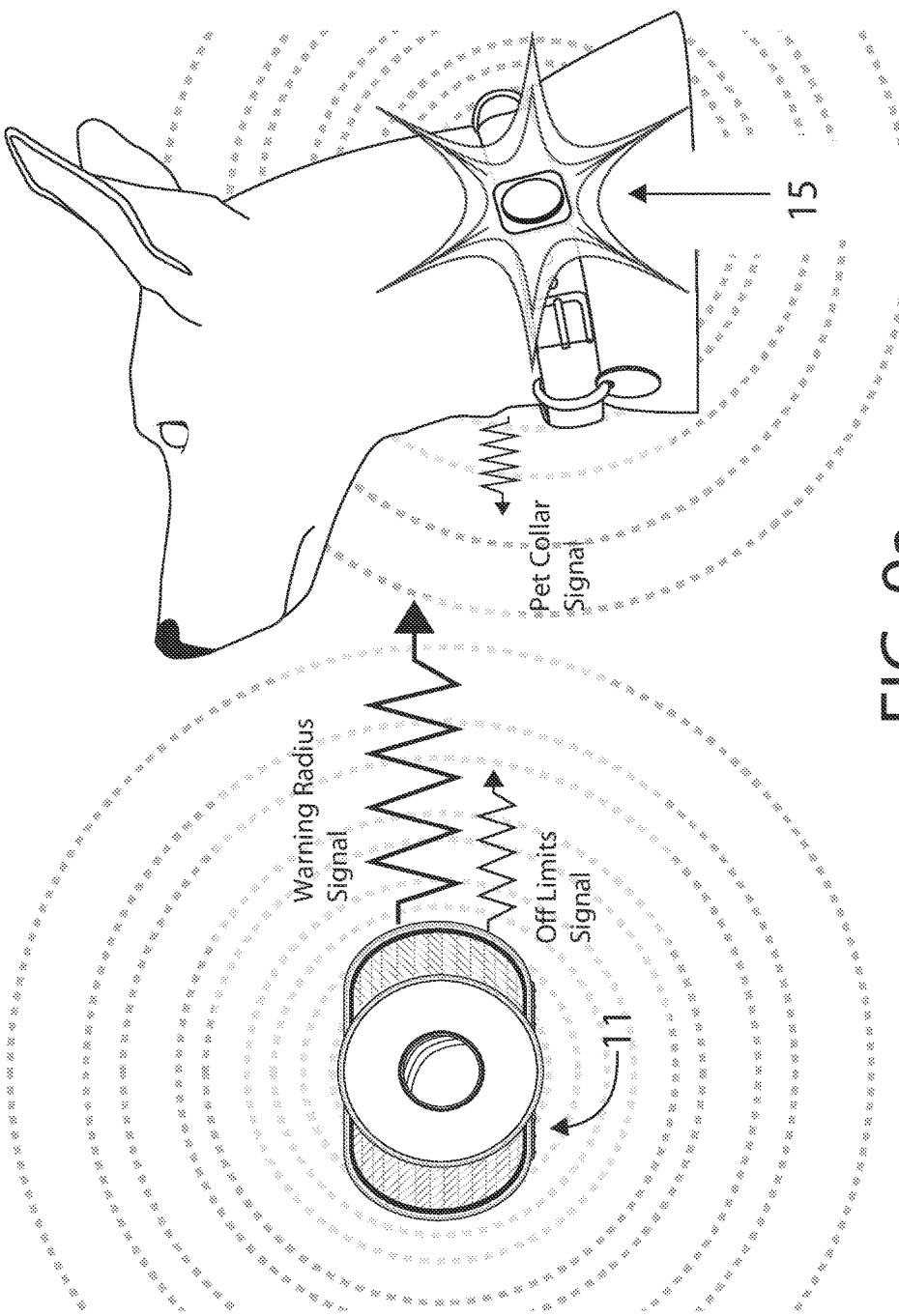
FIG. 9a shows one embodiment according to shared signal production responsibilities between the off limits transmitter/receiver device and pets transmitter/receiver device.

FIG. 9a—In this embodiment, embodiment 1, the off-limits receiver/transmitter (11) emits the furthest and strongest signals. These signals will define both the warning and off-limits radius to the pet's receiver/transmitter. Whereas the pet's receiver/transmitter (15) emits a very short signal, no further than the pet's nose, simply indicating the pet's location. When the pet's receiver/transmitter enters the Warning Area or Off-Limits Area, it will trigger a negative stimulus reaction.

Figure 9B:
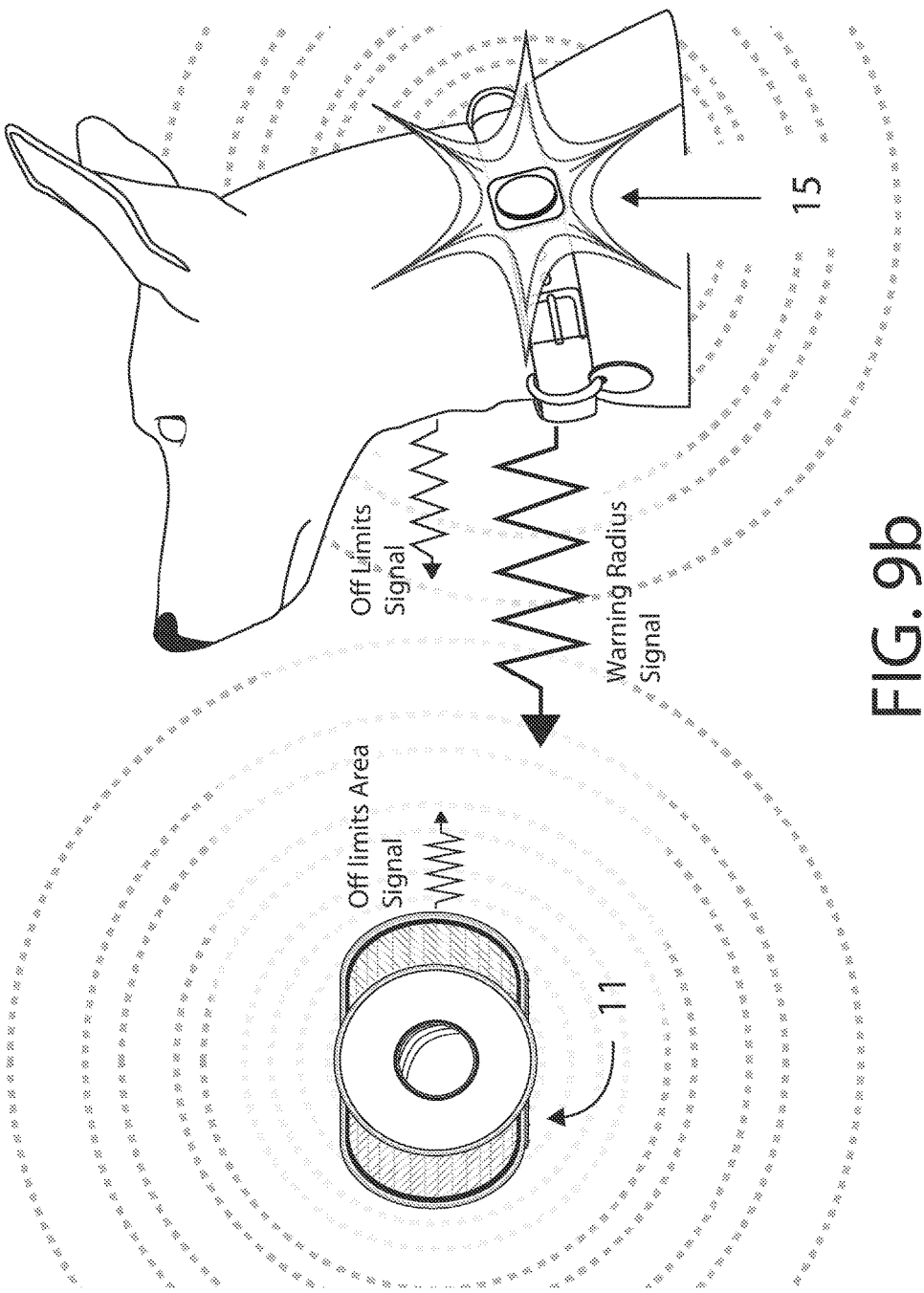
FIG. 9b shows another embodiment according to shared signal production responsibilities between the off limits transmitter/receiver device and pets transmitter/receiver device.

FIG. 9b—In this embodiment, embodiment 2, the Pet transmitter/receiver device (15) emits the furthest signals, which will define both the Warning Area and Off-Limits Area to the Off limits Transmitter/receiver device (11). Whereas the off limits transmitter/receiver device (11) emits a lower signal no further than a foot. This signal only indicates the location of the Off-Limits Object/area and no further. When the pet transmitter/receiver device (15) enters into the off limits area, it will cause a negative stimulus reaction for the pet.

Figure 9C:
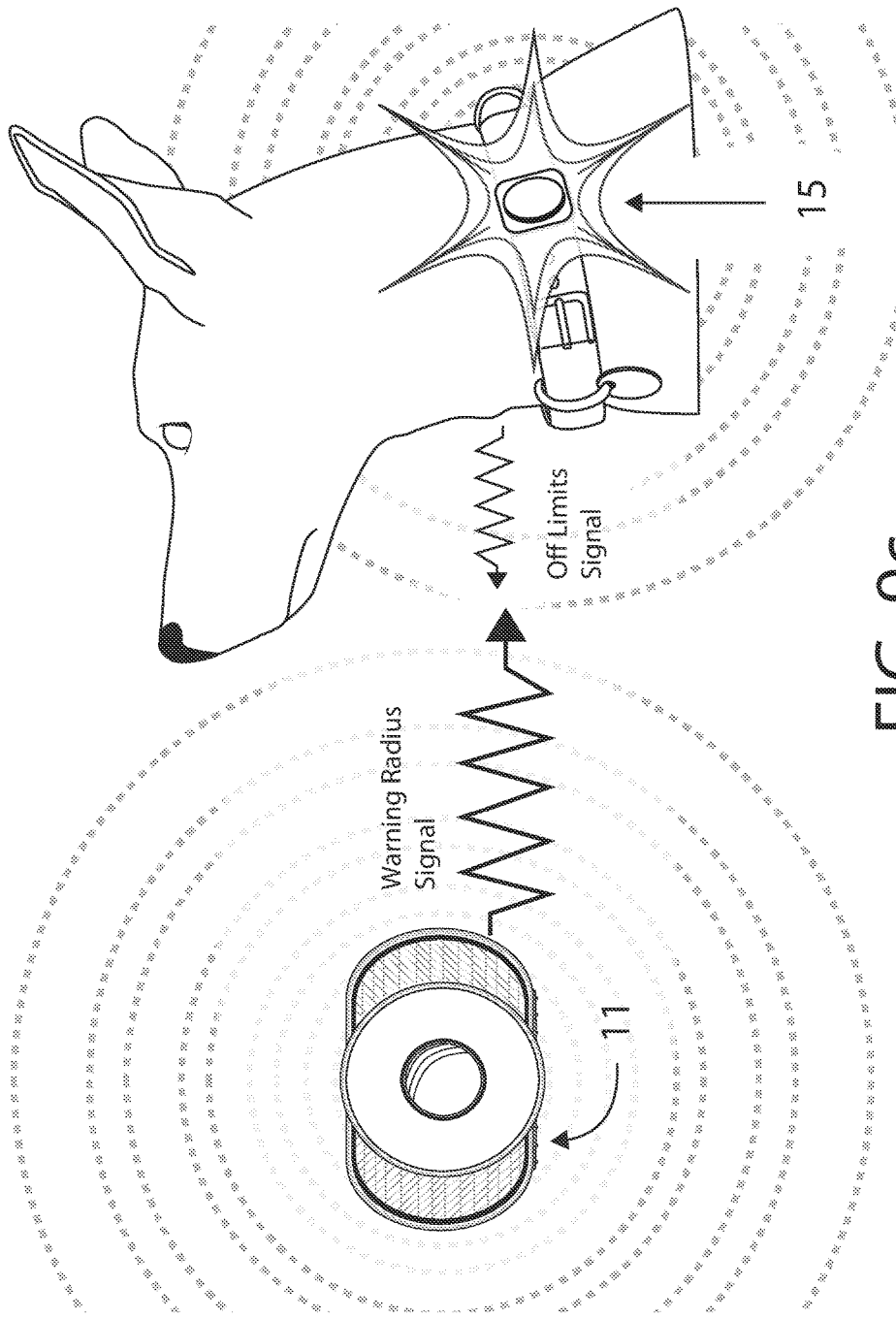
FIG. 9c shows a further embodiment according to shared signal production responsibilities between the off limits transmitter/receiver device and pets transmitter/receiver device.

FIG. 9c—In this embodiment, embodiment 3, the off limits transmitter/receiver device (11) and Pet transmitter/receiver (15) share responsibilities for producing warning and off limit areas. Here the off limits transmitter/receiver device (11) emits the furthest signal, which will define the Warning Area to the Pet Transmitter/receiver device (15). Whereas the Pet transmitter/receiver device (15) emits a lower signal. This signal indicates the Off-Limits radius. When the pet transmitter/receiver device (15) enters into the off limits area, it will cause a negative stimulus reaction for the pet.

FIG. 9d—In this embodiment, embodiment 4, the Pet transmitter/receiver device (15) and off limit transmitter/receiver (11) share responsibilities for producing warning and off limit areas. Here the Pet transmitter/receiver device (15) emits the furthest signal, which will define the Warning Area to the Off limits Transmitter/receiver device (11). Whereas the off limits transmitter/receiver device (11) emits a lower signal. This signal indicates the Off-Limits radius. When the pet transmitter/receiver device (15) enters into the off limits area, it will cause a negative stimulus reaction for the pet.

Figure 10:
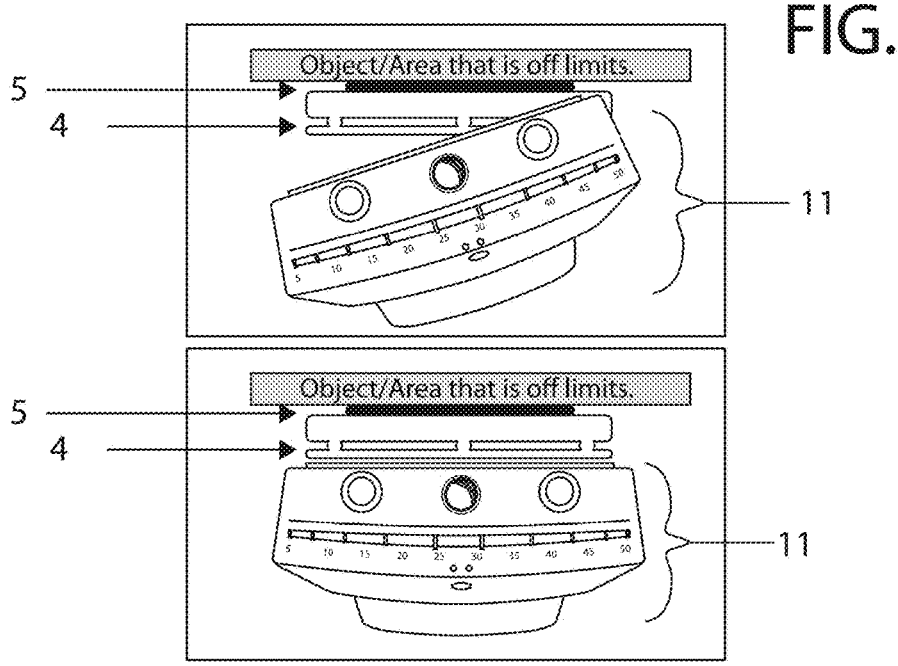
FIG. 10 shows a training mode of the off limits transmitter/receiver device, located on the on/off switch.

FIG. 10—This illustration shows the training mode, located on the on/off switch. In this mode all reactions to the pet entering into an off limits area is heightened creating more awareness of the pet to the off limits area. Likewise there is a vibration that will occur in the off limits transmitter/receiver device which is designed to show the pet that it is that device that is guarding the off limits area. During this vibrating action, the mounting bracket/door (4) will remain secured against the off limits object/area with the attaching adhesive (5), unable to move, whereas the complete off limits device (11) will vibrate back and forth aggressively. This vibrating action will be additional to the already existing loud alarm, LED lights, and other stimulus already taking place.

Figure 11:
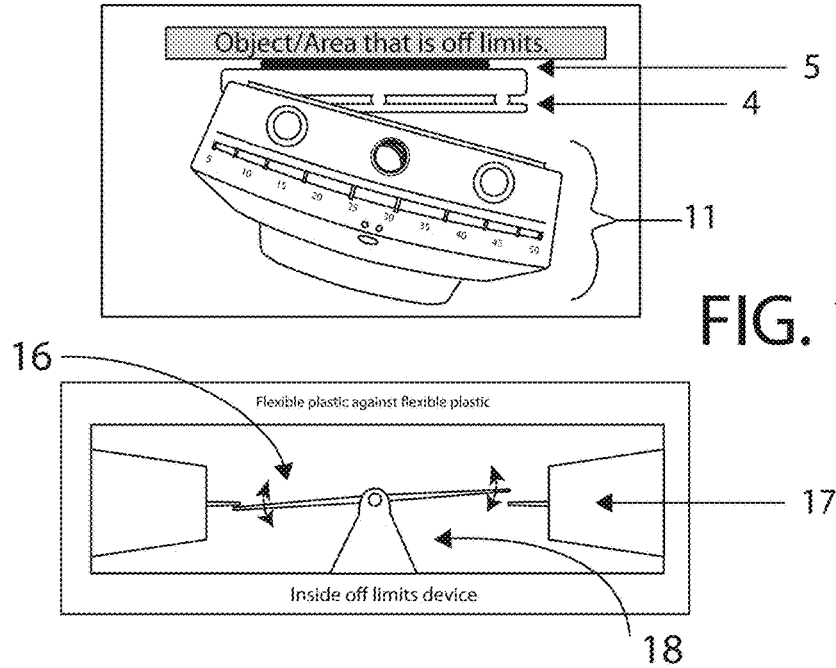
FIG. 11 is a schematic internal view during the vibration or training mode.

FIG. 11—During this mode the rotation motor device (18) will cause the device to vibrate back and forth vigorously causing two flexible plastic arms (16, 17) to be forced against and past one another during the vibration process, creating a very loud, distinct, and continuous clicking noise rendering further reason for the pet to pay attention to device.

Figure 12:
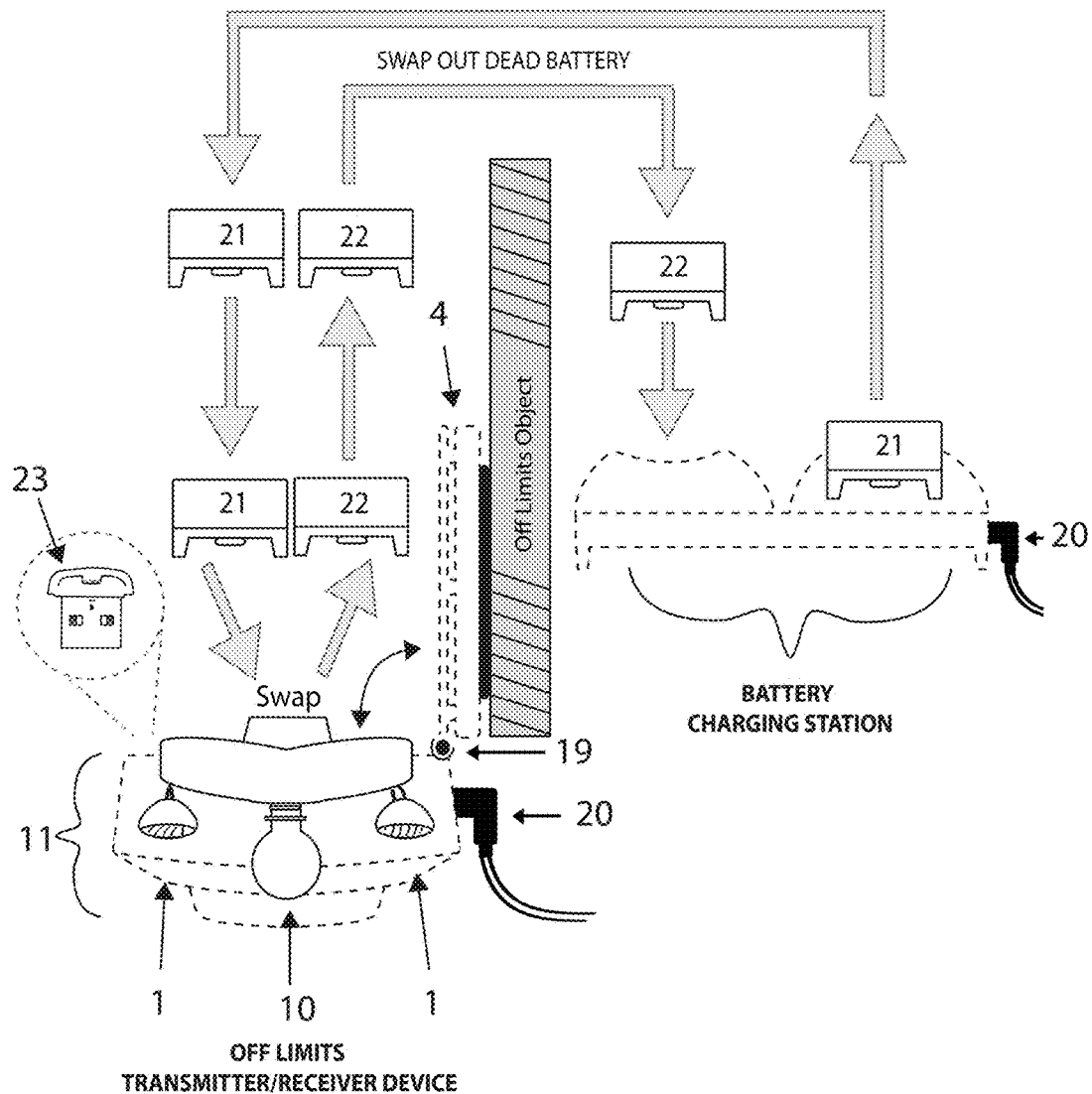
FIG. 12 shows the mechanics between the complete off limits device and the mounting bracket/door.

FIG. 12—The owner can easily access inside the device due to the mounting bracket hinge (19), which allows the complete mounting device (11) to swing open while remaining intact from any angle. Having this access into the device is very important for switching a used dead battery (22), for a fully recharged battery (21) ensuring that the off limit areas are always protected. The battery can easily be replaced by clicking the battery back behind the large LED lighting system (10) and speaker systems (1). Also accessible is the photo storage device (23), where all photos that have been taken of any pets that have entered into the off limits area will be stored. Owner can take this device and see how the pet is entering and/or what pet is doing in area to see what, if any, changes are needed to the area. Also seen in illustration is the electrical plug (20) which can be used if device happens to be located near an outlet.

Figure 13:
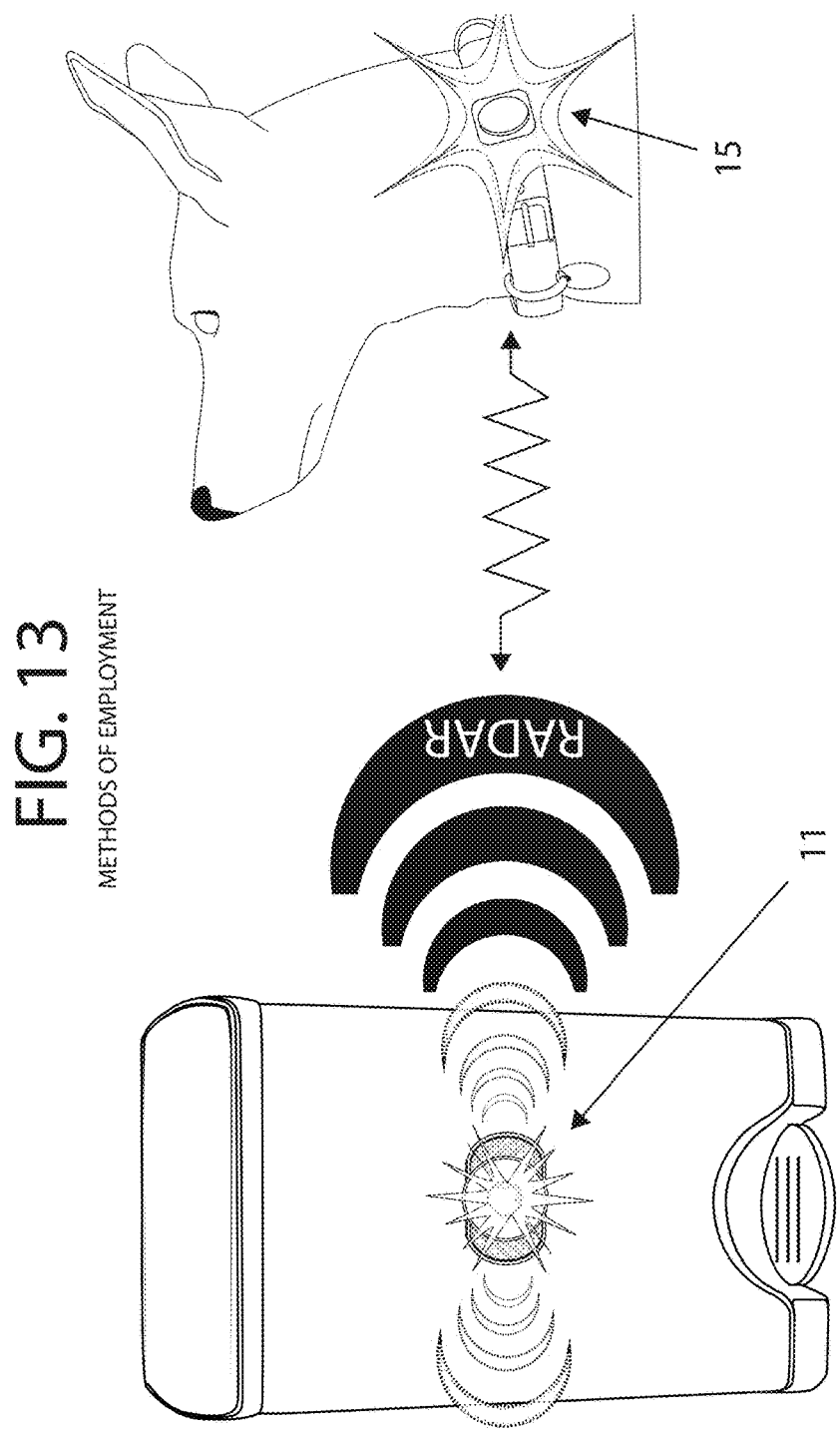
FIG. 13 shows the device being used with radar technology.

In FIGS. 13-15, various additional embodiments for detecting the presence of the pet within the warning zone and the off limits zone are illustrated, including detection with radar technology (FIG. 13), detection with GPS/SAT technology (FIG. 14), and detection with WIFI/Phone technology (FIG. 15). One of ordinary skill in the art should understand that suitable means for defining the warning zone and the off limits zone, including the various means described herein, may be used within the scope of the present disclosure.

It should be understood that the various embodiments of the present disclosure may be implemented through hardware means and/or software means. As such, at least one of the device (11) and the device (15) in the system of the present disclosure may include a processor or CPU, a memory, and circuitry placing the same in communication with at least one transmitter and at least one receiver on the device (11) and/or the device (15). The processor may be configured to execute an instruction set on the memory, and in accordance with that instruction set activate and deactivate the various warnings and off limits penalties described further hereinabove. Alternatively, the at least one of the device (11) and the device (15) in the system may include electrical hardware including switches, transistors, circuit boards, and the like that may be employed to activate and deactivate the various warnings and off limits penalties based on receipt of one or more signals by the at least one receiver on the device (11) and/or the device (15). One of ordinary skill in the art may select suitable hardware means and/or software means for implementing the system of the present disclosure, as desired.

While certain representative embodiments and details have been shown for purposes of illustrating the invention, it will be apparent to those skilled in the art that various changes may be made without departing from the scope of the disclosure, which is further described in the following appended claims.

What is claimed is:

1. A system for repelling a pet from at least one predetermined area, comprising:
a first device including at least one of a first receiver and a first transmitter, the first device configured to selectively provide a first warning and a second warning to the pet, wherein the first device has a housing with a front portion, a rear portion, and a perimeter portion disposed between the front portion and the rear portion, the first warning provided by warning lights emitted from a warning light system, and the second warning provided by a speaker system, the speaker system including at least one auditory alarm configured to emit a high frequency sound that is outside a range of human hearing frequencies, the first device further having a mounting bracket with an inner surface and an outer surface and configured to securely affix the first device to a hard surface of the at least one predetermined area; and
a second device for placement on a collar of the pet, the second device including at least one of a second receiver and a second transmitter in communication with the first device,
wherein an outer warning zone and an inner off-limits zone at the predetermined area are defined by at least one of the first device and the second device, the inner off-limits zone disposed entirely within the outer warning zone, the first device providing the first warning to the pet when the second device enters the outer warning zone, and the first device providing the second warning to the pet when the second device enters the inner off-limits zone.

2. The system of claim 1, wherein the at least one of the warning lights is also activated on a periodic basis outside of the first warning and the second warning to communicate to the pet that the at least one predetermined area is being guarded.

3. The system of claim 1, wherein the high frequency sound is 27 kHz or greater.

4. The system of claim 1, wherein the speaker system is on a timer and ceases to emit the auditory alarm after a predetermined period of time.

5. The system of claim 1, wherein the first device and the second device are paired so that only the paired second device approaching the first devices causes the at least one of the first device and the second device to warn the pet.

6. The system of claim 1, wherein the first device includes vibration means which causes a clicking sound and a vibration of the first device when in a training mode, the training mode configured to train the pet to avoid the first device.

7. The system of claim 6, wherein the vibration means includes a pair of flexible arms rotatable connected to a motor that cooperate with projections on an inside of the first device to create the clicking sound and the vibration.

8. The system of claim 1, a radius of each of the warning zone and the off-limits zone may be adjusted.

9. The system of claim 8, wherein the radius of each of the warning zone and the off-limits zone are adjusted by a dual radius adjusting dial disposed on the first device.

10. The system of claim 1, wherein the first device has a camera configured to take a photograph of the pet when the pet enters at least one of the warning zone and the off limits zone.

11. The system of claim 1, wherein the first device has a motion sensor that detects movement and triggers the first receiver of the first device to be active for receiving a signal from the second transmitter of the second device upon detecting the movement, the first receiver remaining activated until the motion sensor no longer detects the movement.

12. The system of claim 1, wherein the second transmitter of the second device transmits a warning radius signal and an off limits signal, the warning radius signal having a greater strength than a strength of the off limits signal, a receipt of the warning radius signal by the first receiver of the first device causing the first warning, and a receipt of the off limits signal by the first receiver of the first device causing the second warning, wherein the warning signal is received by the first receiver of the first device upon the pet entering the warning zone, and the off limits signal is only received by the first receiver of the first device upon the pet entering the off limits zone.

13. A first device for a system for repelling a pet from at least one predetermined area, comprising:
    a main body having at least one of a first receiver and a first transmitter, the first device configured to selectively provide a first warning and a second warning to the pet, wherein the main body of the first device includes a housing with a front portion, a rear portion, and a perimeter portion disposed between the front portion and the rear portion, the first warning provided by warning lights emitted from a warning light system, and the second warning provided by a speaker system, the speaker system including at least one auditory alarm configured to emit a high frequency sound that is outside a range of human hearing frequencies, and
    a mounting bracket with an inner surface and an outer surface and configured to securely affix the first device to a hard surface of the at least one predetermined area,
    wherein an outer warning zone and an inner off-limits zone at the predetermined area are defined by at least one of the first device and a second device for placement on the pet, the second device including at least one of a second receiver and a second transmitter in communication with the first device, the inner off-limits zone disposed entirely within the outer warning zone, the first device configured to provide the first warning to the pet when the second device enters the outer warning zone, and the first device configured to provide the second warning to the pet when the second device enters the inner off-limits zone.

* * * * *